FULL WAVE SYNCHRONOUS DEMODULATOR

Filed Aug. 21, 1962 3 Sheets-Sheet 1

WITNESSES
Leon J. Vaga
James F. Young

INVENTOR
Francis T. Thompson
BY
Clement L. McHale
ATTORNEY

FULL WAVE SYNCHRONOUS DEMODULATOR 3,265,980

FULL WAVE SYNCHRONOUS DEMODULATOR

Francis T. Thompson, Penn Hills Township, Allegheny County, Pa., assignor to Westinghouse Electric Corporation, Pittsburgh, Pa., a corporation of Pennsylvania Filed Aug. 21, 1962, Ser. No. 218,318

6 Claims. (Cl. 330—10)

This invention relates generally to demodulators and, more particularly, to a full wave synchronous or phase sensitive demodulator.

Low level D.-C. amplifiers are required in measurement and control applications, such as, for example, in telemetering equipment. Chopper amplifiers are used to obtain low drift. Negative feedback is usually used in these amplifiers to stabilize their gain. In a typical D.-C. chopper amplifier the chopper connects an A.-C. amplifier alternatively to a D.-C. signal voltage and to a reference potential. The chopper contacts are controlled by the frequency of the carrier input, for example, 60 cycles. As a result, the input to the A.-C. amplifier is a square wave having a frequency of 60 c.p.s. This waveform is amplified and applied to a synchronous demodulator to provide a waveform having a D.-C. component proportional to the D.-C. signal. The A.-C. component of the synchronous demodulator output is attenuated by a filter in order to obtain a D.-C. output with low ripple. The greater the amount of attenuation desired the larger the filter time constant must be. Large filter time constants result in a poor amplifier time response. Large amounts of filtering complicate the feedback stability problem. For a given time response characteristic, a full wave synchronous demodulator results in considerably less output ripple than a half wave synchronous demodulator. The full wave demodulator has the additional advantage of a higher D.-C. output level. The full wave demodulator can transmit information at twice the maximum rate of the half-wave demodulator.

Utilizing a second set of chopper contacts to connect the filter alternately to opposite ends of a transformer at the output of the A.-C. amplifier is one method used heretofore to obtain synchronus demodulation. However, choppers are relatively expensive and are subject to wear since they contain moving parts and contact members.

Many demodultor circuits utilizing diodes are known. One half-wave circuit requires a reference source which is isolated from ground if one of the output terminals is to be grounded as is desirable for the present application. Furthermore, a full wave circuit is desirable as explained hereinbefore. Full wave circuits previously known require an isolated reference source and four diodes, thereby increasing the cost of the apparatus required for an installation.

Accordingly, an object of this invention is to provide a simple, inexpensive, full wave synchronous demodulator.

Another object of the invention is to provide a synchronous full wave demodulator of the static type.

Other objects of the invention will be explained fully hereinafter or will be apparent to those skilled in the art.

In accordance with one embodiment of the invention, a transformer having a split secondary winding is utilized as the output transformer of the A.-C. amplifier of a chopper amplifier. The outside terminals of the secondary winding are connected to the load circuit through diodes. The inside terminals of this winding are connected across the terminals of a power transformer which are connected to the input terminals of a full wave rectifier which is the power supply for the amplifier. During the positive half cycle of the 60 cycle power voltage, the one inside terminal becomes highly positive while the other inside terminal is clamped near ground potential. During the negative half cycle, the conditions are reversed. Thus, the diodes in the load circuit conduct only on alternate half-cycles to provide the desired synchronous demodulation.

For a better understanding of the nature and objects of the invention, reference may be had to the following detailed description, taken in conjunction with the accompanying drawings, in which.

Figure 1:
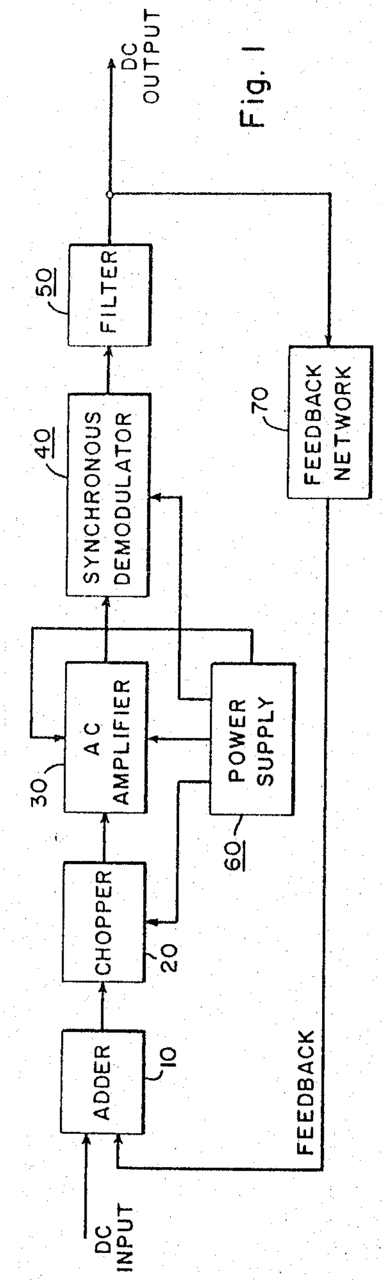
FIGURE 1 is a block diagram of a D.-C. chopper amplifier suitable for utilization in a transmitter for a telemetering system.

Referring now to the drawings, and particularly to FIG. 1, the chopper amplifier shown therein comprises an adder 10, a chopper 20, an A.-C. amplifier 30, a synchronous demodulator 40, a filter 50, a power supply 60 and a feedback network 70. As explained hereinbefore, the chopper amplifier is suitable for utilization in the transmitter of a telemetering system having a transmitter and a receiver connected by a suitable transmission channel. Since the present invention relates to the demodulator and the power supply, details of other components of the system will not be described herein.

As explained hereinbefore, the chopper connects the A.-C. amplifier alternately to the D.-C. signal voltage and to a reference potential. The chopper contacts are controlled by the 60 cycle carrier input. Thus, the input to the A.-C. amplifier is a square wave having a frequency of 60 c.p.s. This waveform is amplified and applied to the synchronous demodulator to provide a waveform having a D.-C. component proportional to the D.-C. signal. The A.-C. component of the demodulator output is attenuated by the filter 50, comprising an inductance 51 and a capacitor 52, in order to obtain a D.-C. output with low ripple at the output terminal 100 in FIG. 2. The D.-C. output may be connected to ground through a resistor RL.

Figure 2:
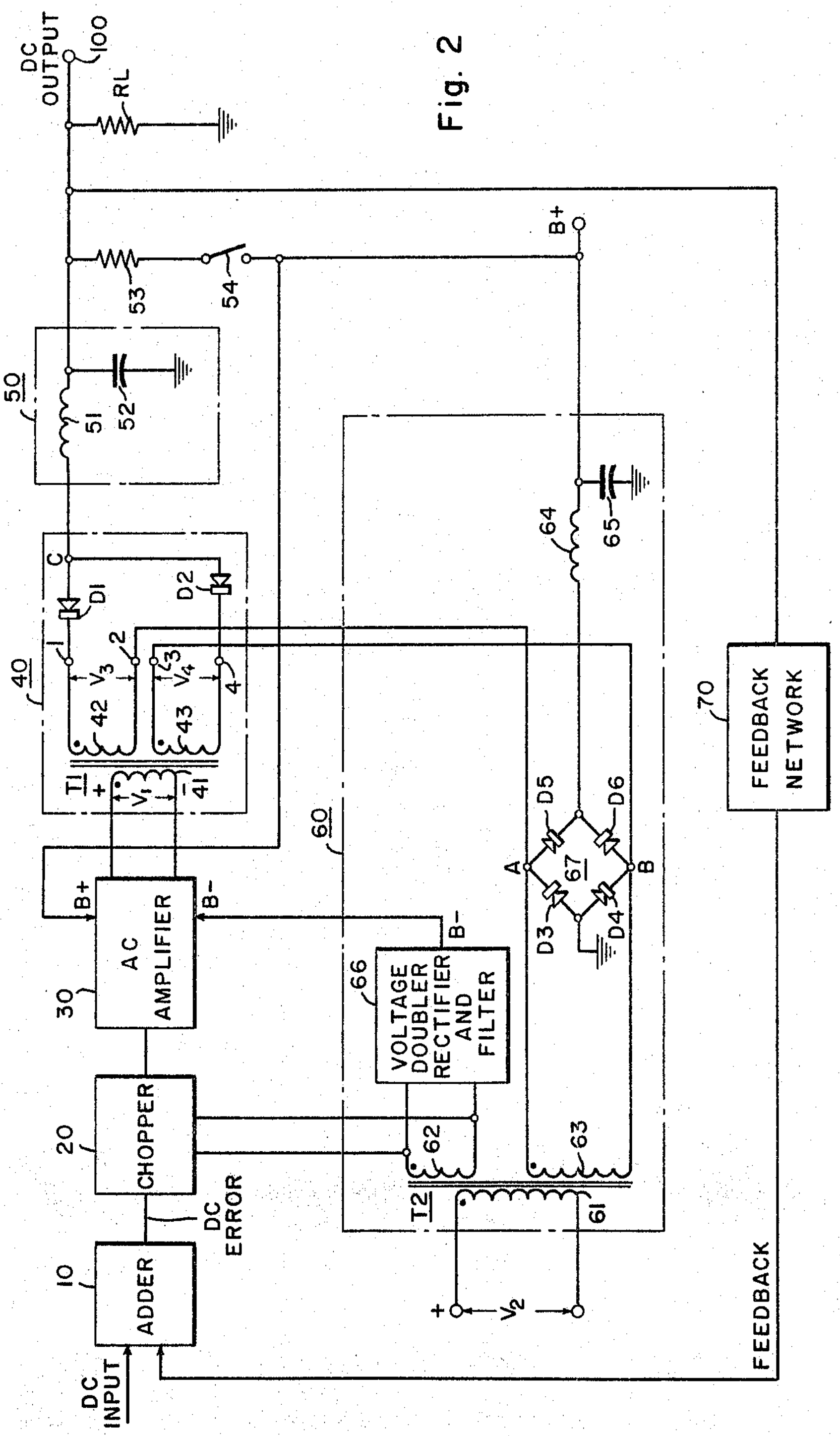
FIG. 2 is a diagram, similar to FIG. 1, showing detail connections of a synchronous demodulator and power supply embodying the principal features of the present invention.

As shown in FIG. 2, the demodulator 40 comprises a transformer T1 and diodes D1 and D2. The transformer T1 has a primary winding 41 and two secondary windings 42 and 43. The primary winding 41 is energized by the output voltage $V_1$ of the amplifier 30. The diode D1 is connected to the outside terminal 1 of the secondary winding 42 and the diode D2 is connected to the outside terminal 4 of the secondary winding 43. The diodes are connected to a common point C which is connected to the filter 50. The voltages across the windings 42 and 43 are designated $V_3$ and $V_4$, respectively. If the inside terminals 2 and 3 of the windings 42 and 43, respectively, were grounded, a simple center-tapped full wave rectifier would be obtained. The output would not be phase sensitive and it would have the characteristic shown in FIG. 5.

Figures 4, 5, 6, 7:
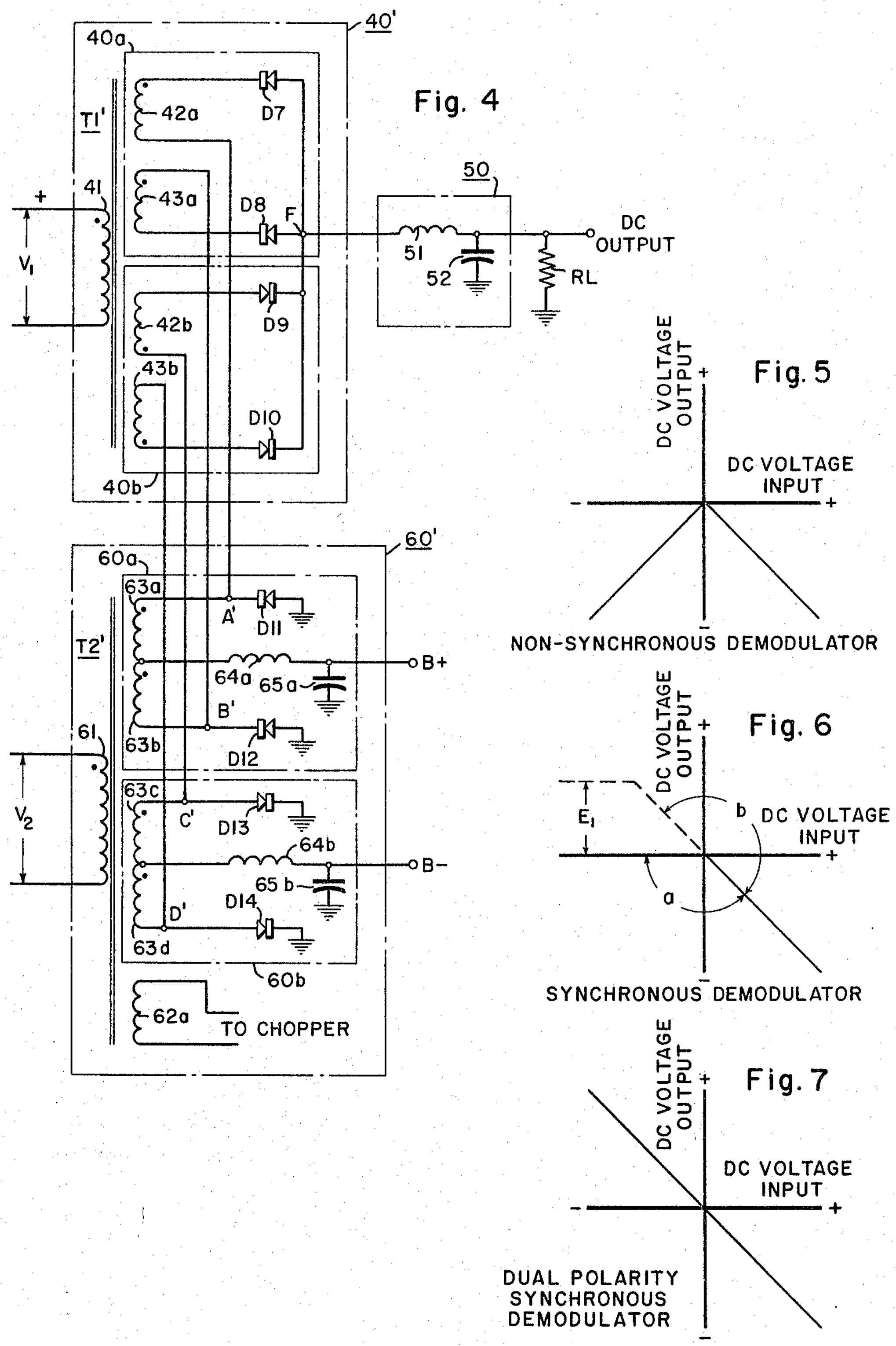
FIG. 4 is a detail view of a two polarity power supply and demodulator which may be utilized in place of the circuits shown in FIGS. 2 and 3.
FIG. 5 is a graphical view showing a characteristic of a non-synchronous demodulator.
FIG. 6 is a graphical view showing a characteristic of a synchronous demodulator.
FIG. 7 is a graphical view showing a characteristic of a dual polarity synchronous demodulator.

In order to obtain the desired synchronous demodulator characteristic of FIG. 6, the inside terminal 2 of the winding 42 is connected to input terminal A, and the inside terminal 3 of winding 43 is connected to input terminal B of a bridge type rectifier 67 of the power supply 60.

As shown, the power supply 60 comprises a power transformer T2 having a primary winding 61 and secondary windings 62 and 63, a voltage doubler rectifier and filter 66, the rectifier 67 and a filter comprising an inductance 64 and a capacitor 65. The rectifier 67 comprises diodes or rectifiers D3, D4, D5 and D6 connected to provide full wave rectification in a manner well known in the art.

The terminals A and B are connected to the winding 63 of the power transformer T2. During the positive half-cycle of the 60 cycle power voltage $V_2$, point A becomes highly positive while point B is clamped near ground potential by conducting diode D4. During the negative half-cycle of $V_2$, point A is clamped near ground potential by conducting diode D3 while point B becomes highly positive.

As previously explained, a 60 cycle square waveform is applied to the transformer T1 from the A.-C. amplifier 30. If terminals 2 and 3 are clamped near ground potential, diodes D1 and D2 will conduct on alternate half-cycles. If the terminals 2 and 3 are connected to a highly positive potential, diodes D1 and D2 will be blocked. Since the terminals 2 and 3 are connected to points A and B, respectively, a negative output proportional to the amplitude of $V_1$ is produced when $V_1$ and $V_2$ are in phase, and zero output is produced when $V_1$ and $V_2$ are 180° out of phase. This results in the desired characteristic shown by the solid line in FIG. 6. If desired, the D.-C. output may be connected to B+ through a switch 54 and a resistor 53 to provide the characteristic shown by the dotted line in FIG. 6.

Figure 3:
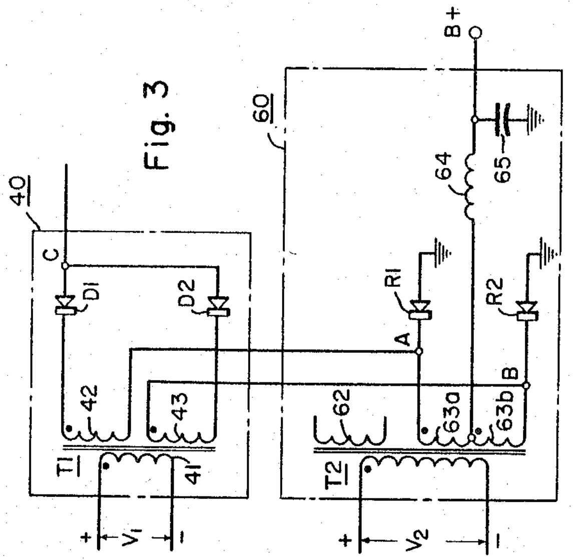
FIG. 3 is a detail view of a modification of the demodulator and power supply.

In the modification shown in FIG. 3, a center-tapped full wave power supply is utilized in place of the full wave bridge power supply of FIG. 2 to provide terminals A and B for connecting to the windings 42 and 43 of the transformer T1. As shown, the center-tapped winding of the transformer T2 has two portions **63*a* and 63*b*. Terminal A is connected to the outside terminal of winding 63*a* and to ground through a diode or rectifier R1. Terminal B is connected to the outside terminal of winding 63*b*** and to ground through a rectifier R2. The demodulator in FIG. 3 functions in the same manner as the one in FIG. 2 to provide the characteristic of FIG. 6.

If the characteristic of FIG. 7 is desired and a two polarity power supply is being used for the circuitry, the modification shown in FIG. 4 may be utilized. As shown, the transformer T1′ has secondary windings **42*a*, 43*a*, 42*b* and 43*b* which are connected to a common point F through diodes D7, D8, D9 and D10, respectively. The point F is connected to the D.-C. output terminal through the filter 50. The secondary winding of the transformer T2′ has portions 63*a*, 63*b*, 63*c* and 63*d* which are connected to ground through diodes D11, D12, D13 and D14, respectively. The center tap between 63*a* and 63*b* is connected to B+ through a filter as in FIG. 3. The center tap between 63*c* and 63*d*** is connected to B− through a filter. Thus, a two polarity power supply is provided and the demodulator has the characteristic shown in FIG. 7.

From the foregoing description it is apparent that the invention provides a synchronous demodulator which is simple in structure and efficient in operation. Furthermore, the demodulator is composed of static devices which have a long life. It may be manufactured at a relatively low cost.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A synchronous demodulator comprising, a signal transformer having two secondary windings, each winding having two terminals, a diode connected to one terminal of one winding, another diode connected to one terminal of the other winding of instantaneously opposite polarity, a first pair of output terminals, the ends of said diodes remote from the windings being connected to a common output terminal of said first pair, a power transformer having a secondary winding, a full wave bridge rectifier having a pair of input terminals connected to the secondary winding of the power transformer and a second pair of output terminals to provide a rectified output, the other terminal of one secondary winding of the signal transformer being connected to one input terminal of the rectifier, and the other terminal of the other secondary winding of the signal transformer being connected to the other input terminal of the rectifier, one of the output terminals of said rectifier being connected to the other output terminal of said first pair of output terminals.

2. A synchronous demodulator comprising, a signal transformer having two secondary windings, each winding having two terminals, a diode connected to one terminal of one winding, another diode connected to one terminal of the other winding of instantaneously opposite polarity, a first pair of output terminals, the ends of said diodes remote from the windings being connected to a common output terminal of said first pair of output terminals, a power transformer having a center-tapped secondary winding, rectifying means having a pair of input terminals connected to the outside terminals of the center-tapped winding and a second pair of output terminals to provide a rectified output, and the other terminals of the secondary windings of the signal transformer being connected to respective outside terminals of the center-tapped winding, the center of said secondary winding being connected to one output terminal of said rectifying means, the other output terminal of said rectifying means being connected to the other terminal of said first pair of output terminals.

3. In an amplifying system, in combination, an amplifier, an output transformer for the amplifier, said transformer having at least two secondary windings, each winding having two terminals, a diode connected to one terminal of each winding of instantaneously opposite polarity, a first pair of output terminals, the ends of said diodes remote from the windings being both connected to one of the first pair of output terminals to provide a direct current output circuit, a power transformer having at least one secondary winding, full wave rectifying means having a pair of input terminals connected to the secondary winding of the power transformer and a second pair of output terminals connected to the amplifier to supply power to said amplifier, the other terminals of the secondary windings of the output transformer being each connected to respective input terminals of the rectifying means which are connected to the secondary winding of the power transformer, one output terminal of said rectifying means being also connected to the other of said first pair of output terminals.

4. In an amplifying system, in combination, an amplifier, an output transformer for the amplifier, said transformer having at least two secondary windings, each winding having two terminals, a diode connected to one terminal of each winding of instantaneously opposite polarity a pair of direct current output terminals, the ends of said diodes remote from the windings being both connected to one of said pair of direct current output terminals, a power transformer having at least one secondary winding, a full wave bridge rectifier having a pair of input terminals connected to the secondary winding of the power transformer and a second pair of output terminals connected to said amplifier for supplying power to the amplifier, and the other terminals of the secondary windings of the output transformer being each connected to the respective input terminals of said bridge rectifier, one output terminal of said rectifier being also connected to the other of said pair of direct current output terminals.

5. In an amplifying system, in combination, an amplifier, an output transformer for the amplifier, said transformer having at least two secondary windings, each winding having two terminals, a diode connected to one terminal of each winding of instantaneously opposite polarity, a pair of direct current output terminals, the ends of said diodes remote from the windings being connected to one of the pair of direct current output terminals, a power transformer having at least one secondary winding, a full wave bridge rectifier having a pair of input terminals connected to the secondary winding of the power transformer and a second pair of output terminals connected to said amplifier for supplying power to the amplifier, the other terminals of the secondary windings of the output transformer being each connected to the respective input terminals of said bridge rectifier, and a resistor connecting one output terminal of the rectifier to said one of the pair of direct current output terminals, the other output terminal of said rectifier being connected to the other of said pair of direct current output terminals.

6. In an amplifying system, in combination, an amplifier, an output transformer for the amplifier, said transformer having a plurality of pairs of secondary windings, each winding having two terminals, a diode connected to one terminal of each winding of each pair of instantaneously opposite polarity, a pair of direct current output terminals, the ends of said diodes remote from the windings being all connected to one of said pair of direct current output terminals, a power transformer having a plurality of center-tapped secondary windings for supplying dual polarity power to the amplifier, rectifying means having a pair of input terminals connected to the outside terminals of each of the center-tapped windings and a pair of output terminals connected to said amplifier to supply power to the amplifier, and the other terminals of each of the secondary windings of the output transformer being connected to said outside terminals of the respective center-tapped windings, one output terminal of each rectifying means being connected to the other of said pair of output terminals, the other output terminal of each rectifying means being connected to said amplifier.

References Cited by the Examiner

UNITED STATES PATENTS 2,898,462 8/1959 Karlson ---------- 329—204 X

ROY LAKE, *Primary Examiner.*

NATHAN KAUFMAN, *Examiner.*